United States Patent [19]

Millar

[11] 4,307,014
[45] Dec. 22, 1981

[54] SOYBEAN PROTEIN ISOLATE PRODUCTION

[75] Inventor: Donald B. Millar, Toronto, Canada

[73] Assignee: General Foods Inc., Toronto, Canada

[21] Appl. No.: 189,644

[22] Filed: Sep. 22, 1980

[51] Int. Cl.³ .............................. A23J 1/12; A23J 1/14
[52] U.S. Cl. .................................... 260/123.5; 426/656
[58] Field of Search ...................................... 260/123.5

[56] References Cited

U.S. PATENT DOCUMENTS

| 4,169,090 | 9/1979 | Murray et al. | 260/123.5 X |
| 4,208,323 | 6/1980 | Murray et al. | 260/123.5 X |
| 4,247,573 | 1/1981 | Murray et al. | 260/123.5 X |

Primary Examiner—Howard E. Schain
Attorney, Agent, or Firm—Sim & McBurney

[57] ABSTRACT

The yield of soybean isolate obtained by collecting protein from an aqueous protein dispersion formed by extracting the protein from soybeans with aqueous food grade salt solution and diluting the protein solution, optionally after concentration of the protein content thereof, is improved by effecting the extraction at a pH of about 5.6 to about 7.0 and adjusting the pH of the protein solution (or concentrate, if the concentration step is used) to a pH of about 4.8 to about 5.4 prior to the dilution step.

6 Claims, No Drawings

SOYBEAN PROTEIN ISOLATE PRODUCTION

FIELD OF INVENTION

The present invention relates to the isolation of proteins from soybeans.

BACKGROUND TO THE INVENTION

In U.S. Pat. Nos. 4,169,090 and 4,208,323, the disclosures of which are incorporated herein by reference, both assigned to the assignee of this application, there are described procedures for isolating protein from protein source materials by contacting the protein source material with sodium chloride solution under critical pH and ionic strength conditions to solubilize the protein, and diluting the protein solution with water to a lower ionic strength to cause the formation of protein aggregates in the aqueous phase which settle and are collected as an amorphous protein micellar mass. The protein solution may be subjected to ultrafiltration prior to the dilution step and the settling may be enhanced by centrifugation.

When this procedure is applied to the isolation of protein from soybeans, the overall yield of isolate has been less than has been attained with other vegetable proteins. However, the soybean isolate is in a substantially undenatured form in contrast to soy isolates which are formed by the conventional isoelectric precipitation procedure, which are substantially denatured. The isoelectric precipitation procedure involves extracting the protein under highly alkaline pH conditions and acidifying the protein extract to the isoelectric point.

SUMMARY OF INVENTION

It has now surprisingly been found that a significant increase in yield of the soybean isolate can be attained, while leaving the substantially undenatured state of isolate substantially unaffected, by effecting the extraction step of the isolation process of U.S. Pat. Nos. 4,169,090 and 4,208,323 at a pH in the range of about 5.6 to about 7.0 and adjusting the pH of the extraction medium to a value in the range of about 4.8 to about 5.4 prior to dilution. The increased yield which is attained under these conditions results from findings that the pH at which maximum solubilization of soybean protein occurs is different from the pH at which maximum precipitation occurs on dilution.

GENERAL DESCRIPTION OF INVENTION AND DESCRIPTION OF PREFERRED EMBODIMENTS

The initial step of the process of this invention involves solubilization of the protein in the soybeans. The soybeans usually are in a defatted comminuted form. Defatting may be effected by any convenient technique to prevent interference by the oil milk extraction. The average particle size of the comminuted material may vary widely, generally between about 10 and about 800 mesh, preferably less than about 200 mesh.

A food grade salt solution is used in the protein solubilization. In the prior art processes of U.S. Pat. Nos. 4,169,090 and 4,208,323 mentioned above, the food grade salt used usually comprised sodium chloride, although mention is made therein of using other food grade salts, such as, potassium chloride or calcium chloride.

The food grade salt solution has an ionic strength of at least about 0.2 molar to enable solubilization of significant quantities of protein to be effected. In view of the greater degree of dilution required with increasing ionic strength, it is usually preferred to utilize an ionic strength value less than about 0.8 molar, and more preferably a value of about 0.3 to about 0.6 molar.

The solubilization of the soybean protein is effected at a temperature of about 15° to about 75° C., preferably up to about 65° C. since any improvement in extraction yield attained above this temperature is often at least partially offset by a degree of denaturation of the process. The solubilization is preferably accompanied by agitation to decrease the solubilization time, which is usually about 10 to about 60 minutes. It is preferred to effect the solubilization to extract substantially the maximum amount of protein from the source material.

The lower temperature limit of about 15° C. is chosen since solubilization is impractically slow below this temperature while the upper temperature of about 75° C. is chosen since substantial denaturation of the protein can occur above this temperature.

The concentration of soybean in the aqueous solution during the solubilization step may vary widely, and is typically within the range of about 5 to about 15% w/v.

In accordance with this invention, the protein extraction step is carried out at a pH of about 5.6 to about 7, preferably about 6.0 to about 6.4. It has been found that the degree of solubilization of the protein by the aqueous food grade salt solution is greater in this range than at lower pH values.

When the protein extraction operation has been effected, the protein solution is separated from resident solid phase extracted material. The resulting protein solution, usually having a protein concentration of about 10 to about 100 g/l, preferably about 30 to about 70 g/l, then may be concentrated, in accordance with the procedure of U.S. Pat. No. 4,208,323, to increase the concentration thereof while maintaining the ionic strength thereof substantially constant.

Any such concentration step may be effected by any convenient selective membrane technique, such as, ultrafiltration. The degree of concentration of the protein solution can be termed the "concentration factor" or more properly "volume reduction factor".

A volume reduction factor of at least 1.1 usually is used and values above about 5.0 to 6.0 are usually avoided since processing difficulties result from the high viscosity of the protein solution. It is preferred to use a volume reduction factor of about 3.0 to 4.0.

The concentration may be effected at any convenient temperature, typically about 20° to about 75° C., and for the period of time to effect the desired degree of concentration. The temperature and other conditions used to some degree depend upon the membrane equipment used to effect the concentration.

The concentrated protein solution resulting from the concentration step generally has a protein concentration of about 40 to about 200 g/l, depending on the initial protein concentration and the volume reduction factor used.

After the concentration step has been effected, the pH of the concentrated protein solution, or the protein solution itself where no concentration is effected is adjusted, in accordance with this invention, to a value in the range of about 4.8 to about 5.4, preferably about 5.1 to about 5.3. This pH adjustment enables a greater yield of soybean protein isolate to be obtained upon subsequent dilution, since the dilution yield is greater in the adjusted pH range than in the extraction pH range. The pH adjustment may be effected using any desired food grade acid, such as, hydrochloric acid.

When the protein solution first is subjected to concentration as described above, the pH adjusted concentrated protein solution is diluted to a lower ionic strength value less than about 0.2 molar, preferably to a value less than about 0.15 molar, and more preferably to an ionic strength in the range of about 0.06 to about 0.12 molar. When the concentration step is omitted, the pH adjusted protein solution is diluted to an ionic strength value less than about 0.1 molar.

The dilution of the concentrated protein solution or protein solution generally is effected by passing the concentrated protein solution into a body of water having the volume required to achieve the ionic strength decrease. This body of water usually has a temperature of less than about 25° C. and preferably has a temperature of about 5° to about 15° C., since improved yields of protein isolate are attained with these colder temperatures.

The decrease in ionic strength causes the formation of a cloud-like mass of protein aggregates which are allowed to settle to form a coalesced dense amorphous sticky protein isolate mass.

The settled soy isolate, in the form of an amorphous, sticky protein mass, termed "protein micellar mass", or PMM, is separated from the aqueous phase. The PMM may be used in the wet form or may be dried by any convenient technique, such as, spray drying, freeze drying or vacuum drum drying, to a dry form.

The soybean isolate which is formed by the procedure of the invention is substantially undenatured, which gives rise to improved functional characteristics when compared with the isoelectrically-precipitated soy isolates.

The isolate is obtained in a yield which is greater than is obtained by the procedure of U.S. Pat. Nos. 4,169,090 and 4,208,323 mentioned above, thereby improving the economics of the formation of substantially undenatured soybean protein isolate.

EXAMPLES

Example 1

This Example illustrates the effect of pH on extraction yield and dilution yield.

Defatted ground soybean meal having a protein content (TKN×5.71) of 49.4% was extracted in 30 g samples using an 0.6 M sodium chloride solution at 10% w/v and 45° C. for 30 minutes at various pH values from 4.5 to 6.8. After separation of the aqueous extract solution from the residual solid phase, the protein concentration of each extract solution was determined and thence the extraction yield at the pH of extraction.

180 mls of each extract solution was diluted into 720 mls of water, i.e., a dilution ratio of 4:1 and the aqueous dispersion of protein aggregates which resulted was settled and the settled amorphous protein mass was dried. The yield of protein isolate from the extract solution, i.e., the dilution yield, or yield of extract, was determined in each case.

The results are reproduced in the following Table I:

TABLE I

| pH of Extraction Solution | Extraction Yield (wt. %) | Dilution Yield (wt. %) |
| --- | --- | --- |
| 4.8 | 66.2 | 59.9 |
| 4.9 | 69.2 | 65.6 |
| 5.0 | 77.3 | 60.2 |
| 5.1 | 75.1 | 59.1 |
| 5.2 | 76.7 | 63.8 |
| 5.3 | 82.8 | 56.9 |
| 5.4 | 82.7 | 58.7 |
| 5.5 | 84.3 | 59.3 |
| 5.6 | 84.1 | 55.7 |
| 5.7 | 86.5 | 55.8 |
| 5.8 | 86.8 | 50.3 |
| 5.9 | 87.6 | 51.4 |
| 6.0 | 85.7 | 50.9 |
| 6.1 | 85.2 | 49.9 |
| 6.2 | 80.8 | 49.3 |
| 6.3 | 91.4 | 42.7 |
| 6.4 | 92.8 | 44.2 |
| 6.5 | 90.2 | 41.6 |
| 6.6 | 93.1 | 41.6 |
| 6.7 | 92.6 | 39.3 |
| 6.8 | 93.1 | 38.8 |

The results of above Table I show that as the pH of the aqueous extraction medium, and hence of the protein solution, increases, the extraction yield also increases while at the same time the dilution yield decreases. Extraction of protein at the higher pH values and dilution at the lower pH values takes advantage of these phenomena to improve the yield of isolate.

Example 2

This Example illustrates the effect of adjustment of pH on overall process yield.

Defatted ground soybean meal having a protein content of (TKN×5.71) of 49.4% was extracted on a pilot plant scale using an 0.5 M aqueous sodium chloride solution of pH 6.3 at 10% w/v and 45° C. for 30 minutes. 11.35 kg of soybean meal was extracted with 113.5 liters of extraction medium. After separation of the aqueous extract solution from the residual solid phase, the extract solution was concentrated 4.0 times on a hollow-fibre ultrafiltration unit.

150 ml samples of the concentrated solution were adjusted in pH using hydrochloric acid to a series of pH values down to pH 5 and the samples were separately diluted into 750 ml of cold (10° C.) tap water to form a turbid suspension of protein aggregates. The dispersion was settled by the use of centrifugation at 5000×g for 10 minutes.

In each case, the process yield was determined, and the results are reproduced in the following Table II:

TABLE II

| pH of Concentrated Protein Solution | 6.3 | 6.2 | 6.1 | 6.0 | 5.9 | 5.8 | 5.7 | 5.6 | 5.55 | 5.50 | 5.45 | 5.40 | 5.35 | 5.30 | 5.25 | 5.20 | 5.1 |
| --- | --- | --- | --- | --- | --- | --- | --- | --- | --- | --- | --- | --- | --- | --- | --- | --- | --- |
| Yield (wt. %) | 33.7 | 35.5 | 35.2 | 37.0 | 36.9 | 37.0 | 37.1 | 39.3 | 37.9 | 38.7 | 36.8 | 37.7 | 43.1 | 41.5 | 41.4 | 41.1 | 45.5 |

The results of the above Table II show that there is steady increase in overall process yield with increasing adjustments in pH towards more acid values.

SUMMARY OF DISCLOSURE

In summary of this disclosure, the present invention relates to a novel procedure for the recovery of soybean isolate in improved yield. Modifications are possible within the scope of the invention.

What I claim is:

1. In a process for the formation of a soybean protein isolate by contacting soybeans with an aqueous food grade salt solution of ionic strength of at least about 0.2 molar to solubilize the protein, diluting the protein solution to an ionic strength sufficient to form a protein dispersion in the aqueous phase, and collecting the protein from the dispersion as an amorphous mass of soybean protein isolate, the improvement which comprises effecting said soybean contact using an aqueous food grade salt solution having a pH of about 5.6 to 7.0, adjusting the pH of the protein solution to a value of about 4.8 to about 5.35 and diluting said pH adjusted protein solution.

2. The process of claim 1 wherein said aqueous food grade salt solution has a pH of about 6.0 to about 6.4 and the pH is adjusted to a value of about 5.1 to about 5.3.

3. The process of claim 2 wherein said pH adjustment is effected using hydrochloric acid.

4. The process of claim 1, 2 or 3 wherein said soybeans are contacted with said aqueous food grade salt solution at a temperature of about 15° to about 75° C. and the pH adjusted protein solution is diluted to an ionic strength of less than about 0.1 molar to form said protein dispersion.

5. The process of claim 1, 2 or 3 wherein said soybeans are contacted with said aqueous food grade salt solution at a temperature of about 15° to about 5° C., the concentration of the protein solution resulting from said contact is increased while the ionic strength thereof is maintained substantially constant prior to said pH adjustment, and the pH adjusted protein solution is diluted to a lower ionic strength below about 0.2 molar to form the protein dispersion.

6. The process of claim 5 wherein the protein concentration step is effected by a membrane technique at a volume reduction factor of about 1.1 to about 6.0, as determined by the volume of protein solution and the volume of concentrated protein solution, and the dilution of the pH adjusted protein solution is effected by passing the same into a body of water having a temperature below about 25° C. and a volume sufficient to decrease the ionic strength of the concentrated protein solution to a value of about 0.06 to about 0.12 molar.

* * * * *